US008438495B1

(12) United States Patent
Gilra et al.

(10) Patent No.: US 8,438,495 B1
(45) Date of Patent: May 7, 2013

(54) METHODS AND SYSTEMS FOR CREATING WIREFRAMES AND MANAGING CONTAINERS

(75) Inventors: Anant Gilra, Bangalore (IN); Eugene Jude, Bangalore (IN)

(73) Assignee: Adobe Systems Incorporated, San Jose, CA (US)

( * ) Notice: Subject to any disclaimer, the term of this patent is extended or adjusted under 35 U.S.C. 154(b) by 452 days.

(21) Appl. No.: 12/542,049

(22) Filed: Aug. 17, 2009

(51) Int. Cl.
*G06F 3/048* (2006.01)
*G06F 3/01* (2006.01)

(52) U.S. Cl.
USPC ........... 715/781; 715/853; 715/782; 715/841; 345/173

(58) Field of Classification Search .............. 715/781, 715/853, 841, 792; 345/173
See application file for complete search history.

(56) References Cited

U.S. PATENT DOCUMENTS

| | | | |
|---|---|---|---|
| 6,195,094 B1* | 2/2001 | Celebiler | 715/764 |
| 6,874,128 B1* | 3/2005 | Moore et al. | 715/792 |
| 2003/0034991 A1* | 2/2003 | Fitzsimons et al. | 345/660 |
| 2007/0240071 A1* | 10/2007 | Sherrill et al. | 715/764 |
| 2008/0222166 A1* | 9/2008 | Hultgren et al. | 707/100 |
| 2009/0002764 A1* | 1/2009 | Atkins et al. | 358/1.18 |
| 2009/0044145 A1* | 2/2009 | Seo | 715/804 |
| 2009/0089704 A1* | 4/2009 | Makela | 715/781 |
| 2009/0327966 A1* | 12/2009 | Paajanen | 715/835 |
| 2010/0058216 A1* | 3/2010 | Yoon et al. | 715/769 |
| 2010/0058220 A1* | 3/2010 | Carpenter | 715/772 |
| 2010/0293501 A1* | 11/2010 | Russ et al. | 715/803 |

* cited by examiner

*Primary Examiner* — Ramsey Refai
*Assistant Examiner* — Toan Vu
(74) *Attorney, Agent, or Firm* — Kilpatrick Townsend & Stockton LLP

(57) ABSTRACT

A design application can provide a mechanism for quickly and intuitively designing wireframes by automatically generating containers and margins. For example, a graphical user interface can be provided in which a parent container is defined and surrounded by a boundary ("wirebox"), which may (or may not) include margins defined between the wirebox and container perimeter. Responsive to input data representing a user gesture, such as clicking and dragging at a wirebox boundary, the parent container can be divided into two or more containers. In some embodiments a tree structure with memory locations (e.g., folders) corresponding to the containers can be defined alongside and in response to definition of containers in the wireframe.

19 Claims, 10 Drawing Sheets

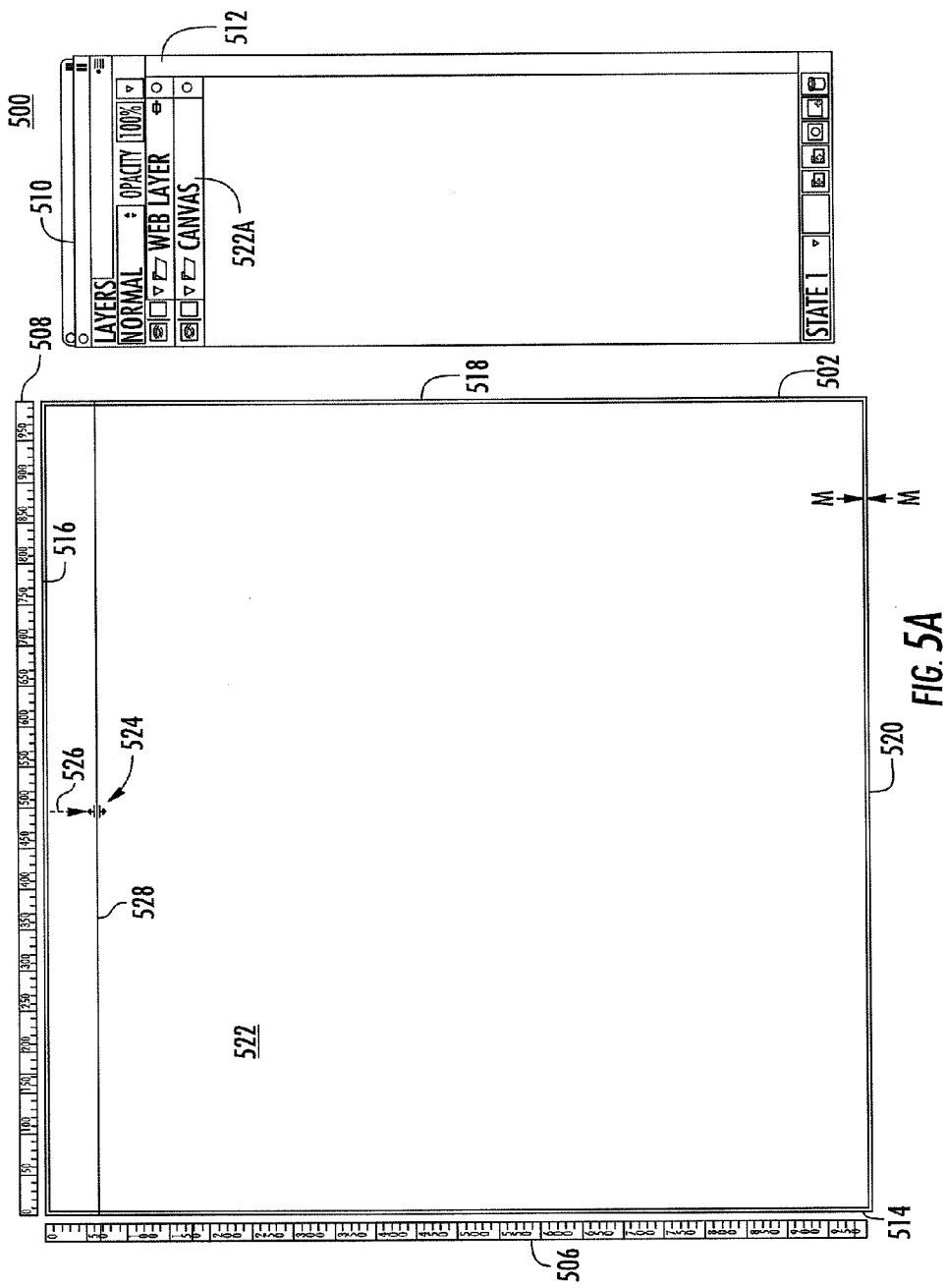

FIG. 6

METHODS AND SYSTEMS FOR CREATING WIREFRAMES AND MANAGING CONTAINERS

TECHNICAL FIELD

The disclosure below generally relates to design interfaces, particularly to wireframes and containers.

BACKGROUND

Interfaces for viewing content, such as web sites and views of applications, can be designed using "wireframes" that define a plurality of containers. Each container can correspond to a part of the screen area of a view of the web site or application and content items (e.g., graphics, text, video, functional components such as buttons, etc.) can be associated with the different containers during the design process. For example, a site may include a header container occupying the top portion of the screen area and a footer container occupying the bottom portion of the screen area. A body container can lie between the header and footer. The body container may contain several nested containers, such as a navigation bar at the left (or right) side of the body and a content area in the remainder of the body.

During the design of an interface, a wireframe may be generated by drawing multiple rectangles and positioning the rectangles. However, this may not be satisfactory. For example, even with guides provided by a graphics editing application in which the rectangles are drawn, moving and adjusting the rectangles may be tedious. In such a scenario, the rectangles may have no logical identity as containers, which may add more complexity when it is time to implement the design. Implementing the design can involve determining locations for storing content items and writing code for accessing those items when the interface is used. Revising the design with differently-sized or differently-positioned containers may entail starting over with new sets of rectangles.

SUMMARY

In accordance with one or more aspects of the present subject matter, a design application can provide a mechanism for quickly and intuitively designing wireframes by automatically generating containers and margins. For example, a graphical user interface can be provided in which a parent container is defined and surrounded by a boundary ("wirebox"), which may (or may not) include margins defined between the wirebox and container perimeter. Responsive to input data representing a user gesture, such as clicking and dragging at a wirebox boundary, the parent container can be divided into two or more containers. In some embodiments a tree structure (e.g., logic representing a hierarchy of folders) corresponding to the containers can be defined alongside and in response to definition of containers in the wireframe.

Embodiments include a method comprising receiving data representing selection of a wire defining a border of a parent wirebox in a wireframe and input specifying an intended split of the parent wirebox. For instance, a user gesture such as dragging from the wirebox border to a stopping location may specify an intended split of the parent wirebox at the stopping location. In response to the input specifying the intended split, the parent wirebox can be split into a plurality of child wireboxes, with containers defined in the newly-created child wireboxes. In some embodiments, the method includes assigning a direction to the child wireboxes based on whether the split divides the parent wirebox over its width or height.

In some embodiments, a tree structure as noted above is defined, with entries in the tree structure corresponding to containers comprised in the wireboxes. When a split occurs, entries for the containers corresponding to the child wireboxes can replace the entry for the container corresponding to the parent if the child wireboxes have the same direction as the parent or can be nested in the hierarchy below the parent if the child wireboxes have a different direction from the parent. The hierarchy may include a container for a wirebox that does not directly include a corresponding container itself, but instead has nested leaf wireboxes with child containers in the leaf wireboxes.

Embodiments also include software applications that can use the tree structure and wireframe for managing components of a design being edited, such as by using wireframe containers for selecting portions of the design and applying effects or other edits to the portions of the design in the selected container(s).

Embodiments also include computing systems and computer-readable media embodying program code for defining and/or using wireframes. These illustrative embodiments are mentioned not to limit or define the limits of the present subject matter, but to provide examples to aid understanding thereof. Illustrative embodiments are discussed in the Detailed Description, and further description is provided there. Advantages offered by various embodiments may be further understood by examining this specification and/or by practicing one or more embodiments of the claimed subject matter.

BRIEF DESCRIPTION OF THE DRAWINGS

A full and enabling disclosure is set forth more particularly in the remainder of the specification. The specification makes reference to the following appended figures.

FIGS. 5A-5F illustrate exemplary output during definition and use of a wireframe.

FIG. 6 illustrates an example of using a wireframe for layout and selection of content items of a composite media object.

DETAILED DESCRIPTION

Reference will now be made in detail to various and alternative exemplary embodiments and to the accompanying drawings. Each example is provided by way of explanation, and not as a limitation. It will be apparent to those skilled in the art that modifications and variations can be made. For instance, features illustrated or described as part of one embodiment may be used on another embodiment to yield a still further embodiment. Thus, it is intended that this disclosure includes modifications and variations as come within the scope of the appended claims and their equivalents.

In the following detailed description, numerous specific details are set forth to provide a thorough understanding of the claimed subject matter. However, it will be understood by those skilled in the art that claimed subject matter may be practiced without these specific details. In other instances, methods, apparatuses or systems that would be known by one of ordinary skill have not been described in detail so as not to obscure the claimed subject matter.

Exemplary Hardware and Software Components

Figure 1:
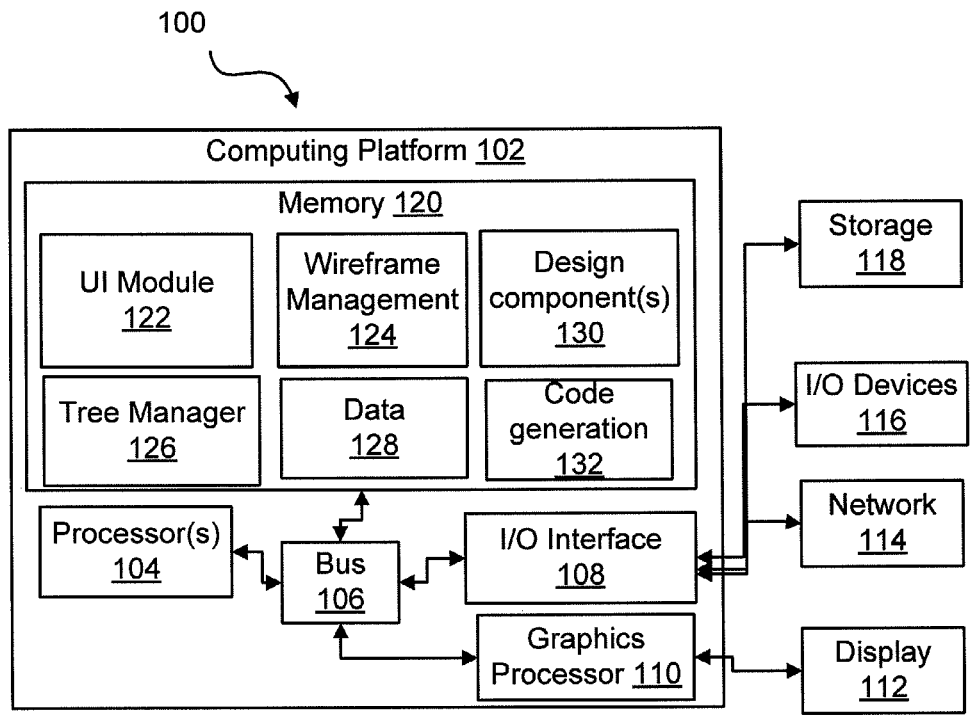
FIG. 1 is a block diagram illustrating an example of a computing system configured to provide wireframe functionality in accordance with one or more aspects of the present subject matter.

FIG. 1 is a block diagram illustrating an example of a computing system 100, which in this example is configured to provide wireframe functionality in accordance with one or more aspects of the present subject matter. In this example, computing system 100 includes a computing device 102 comprising one or more processors 104, a bus 106, memory 120, input-output (I/O) handling components 108, graphics processor/interface 110, a display 112, user input (UI) devices 116 (e.g., a mouse, keyboard, touch screen interface, etc.), one or more networking or other interfaces 116 (e.g., Ethernet, USB, etc.), and storage 118 (e.g., hard disk, optical drive(s)). Memory 120 represents one or more computer-readable media accessible by processor(s) 104.

Memory 120 embodies several program components that configure computing system 100 to function, including a user interface module 122, wireframe management module 124, tree structure management module 126, data structure(s) 128, one or more applications 130, and a code generation module 132. For example, UI module 122, wireframe manager 124, and tree manager 126 may comprise components of a wireframe design application that is used to define and utilize a wireframe for use by one or more of design component(s) 130. Other components, such as an operating system, runtime environment, and other applications may be embodied in memory as well.

As an example, a design component 130 may comprise a separate design application, such as a web design application, an application development environment such as an IDE, or a graphics editing application. A wireframe may be designed for use by or alongside application 130, such as to aid in the design of an interface for an application under development, a web site, or in editing an image, respectively.

As another example, module 122, wireframe management module 124, and tree manager 126 may be integrated along with design component(s) 130 into a single application. For example, wireframe generation and management capabilities in accordance with the present subject matter can be integrated into a web design application, IDE, graphics editing application, or another application, with design component(s) 130 representing software modules that provide the design functionality (e.g., raster or vector graphics editing capabilities, code production, etc.). These and other examples herein are provided for purposes of illustration only and are not meant to limit the potential use cases for a wireframe.

Data 128 can represent one or more content items used in conjunction with the wireframe, such as art fragments and other content of a web page, skins for an application under development, or different portions of a composite image, such as objects in different layers of the image. Data 128 may also include data representing the wireframe, hierarchical structure, and/or other data relied upon during design or use of the wireframe.

UI module 122 can provide a graphical user interface for designing and editing the wireframe. When integrated into an application with component(s) 130, UI module 122 can also provide input and output for component(s) 130 and other aspects of the application, such as reflecting edits made via a graphic editing module, providing an interface for opening, closing, and moving files, and other typical functionality.

UI module 122 may provide data for displaying a canvas in which the wireframe is designed or edited and can receive data representing user input such as gestures (e.g., clicks, drags, hovers, and other mouse/touch input), menu selections, keyboard input, and other input. Wireframe management module 124 can be used to create or update one or more data structures representing the wireframe in response to the input relayed by UI module 122. UI module 122 can provide output reflecting changes to the size, position, and other aspects of the wireframe and may provide other output (e.g., audio cues) as well.

In some embodiments, a user may click and drag or provide other input to split containers in the wireframe into one or more child containers, adjust margins and padding, and adjust the relative size/position of containers as they appear in the graphical user interface. In response to the input, wireframe management module 124 can update the wireframe data accordingly. The wireframe data can comprise data representing the wires, container size and coordinates, margins and margin display parameters, and other information used to define the wireframe.

In some embodiments, wireframe management module 124 can also work in conjunction with UI module 122 to determine the relationship between a content item and a portion of the wireframe. For example, a user may define or drag and drop an artwork fragment into a particular container in the graphical user interface, may click on one or more fragments already in a container, or may select a particular container of interest. These actions can be interpreted by wireframe management module 124 to track associations between the artwork fragment(s) (or other content items) and containers so that selection and other actions made with respect to the wireframe and containers can be used by design component(s) 130.

As an example, a user of a graphic editing application that includes wireframe capability may create a vector or raster graphic inside a container. As another example, the user may drag-and-drop gesture may place a content item in a container so that data representing the content item (e.g., the image file for an artwork fragment) is stored in the folder mapped to the container. Thus, the wireframe can be used to align graphics and create a directory structure for use in a web page or other interface. Additionally or alternatively, the coordinates of the container can be used to establish coordinates for displaying the graphic. In addition to or instead of a graphic, a content item such as a dialog box, menu selection element, or video file (or video player) could be dragged-and-dropped or defined in a container.

As another example, each container may be used to identify components of a composite object, such as a multilayer graphic, positioned in a portion of the area occupied by the composite object. The identification of the components can be used to facilitate further action, such as selection of components in the container, moving the components, and other activities preformed using design component(s) 130.

Tree manager 126 can be used in some embodiments to maintain (i.e., generate or update) a tree structure with logical components corresponding to the wireboxes/containers alongside and in response to definition of wireboxes/containers in the wireframe. For example, in some embodiments a hierarchy of nested folders can be defined based on container definitions and can be used to organize portions of data 128 comprising content items. In some embodiments, an initial parent container may have a corresponding folder in the tree structure and then child containers defined within the parent container may have corresponding folders nested in the folder for the parent.

Code generation module 132 can be included in some embodiments for use in generating HTML, CSS, and/or other code for implementing a design as laid out using the wireframe. Code generation module 132 may comprise a standalone component or may, for example, be integrated into a design component 130 such as a web page authoring application or graphics editing application.

In the above example, the wireframe functionality is hosted locally. In some embodiments, a computing device may comprise one or more servers to provide wireframe capabilities in accordance with the present subject matter as a web service/internet application. As an example, a client device may be used for providing output and receiving input, with data relayed over a network to the web service via an API for invoking the wireframe manager, tree generator, and the like, which are provided by the web service/internet application.

Exemplary Wireframe and Containers

Figure 2:
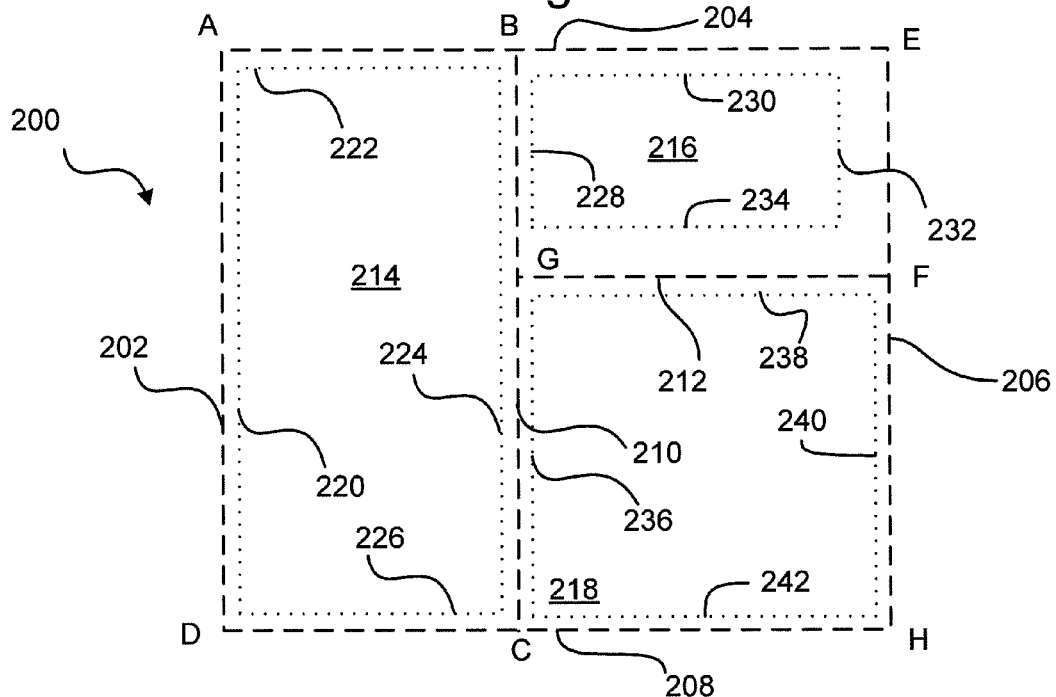
FIG. 2 is a block diagram illustrating an example design canvas depicting a wireframe.

FIG. 2 is a block diagram illustrating an example design canvas 200. In this example, the design canvas comprises a canvas parent container corresponding to a wirebox comprising wires 202, 204, 206, and 208 with additional containers inside. As used herein, a wire refers to any line in the wireframe, while a wirebox refers to any four closed wires. A "leaf wirebox" is a wirebox without additional wires in between (i.e., a leaf wirebox does not contain any further wireboxes).

In some embodiments, each container of a wireframe is associated with a leaf wirebox that is a child wirebox but is not a parent wirebox. The containers for the leaf wireboxes may be mutually exclusive. In some such embodiments, the non-leaf wireboxes may also have corresponding entries in a folder structure or other hierarchy, but will not include a separately-visible container in the user interface.

In this example, canvas 200 includes five wireboxes, a first wirebox (ABCD) defined by wires 202, 210, and the left portions of wires 204 and 208; a second wirebox (BEFG) defined by wire 212, the right portion of wire 204, and the top portions of wires 206 and 210; a third wirebox (GFHC) defined by wire 212, the lower portions of wires 206 and 210, and the right portion of wire 208; a fourth wirebox (BEHC) defined by wires 204, 206, 208, and 210; and a fifth wirebox (AEHD) formed by wires 202, 204, 206, and 208.

In this example, wireboxes ABCD, BEFG, and GFCH are leaf wireboxes. Leaf wireboxes include a container defined therein; other, non-leaf wireboxes (i.e., parent wireboxes) do not directly define containers themselves, but include containers defined by leaf wireboxes nested therein. For instance, wirebox ABCD defines a container 214, wirebox BEFG defines a container 216, and wirebox GFHC defines a container 218. In this example, container borders are inside the wireboxes and thus define margins, with the borders indicated by dotted lines 220, 222, 224, 226, 228, 230, 232, 234, 236, 238, 240, and 242. Although margins are illustrated here, a container may occupy the entire area inside a leaf wirebox if desired.

Exemplary Methods for Defining/Editing One or More Wireframes

Figure 3:
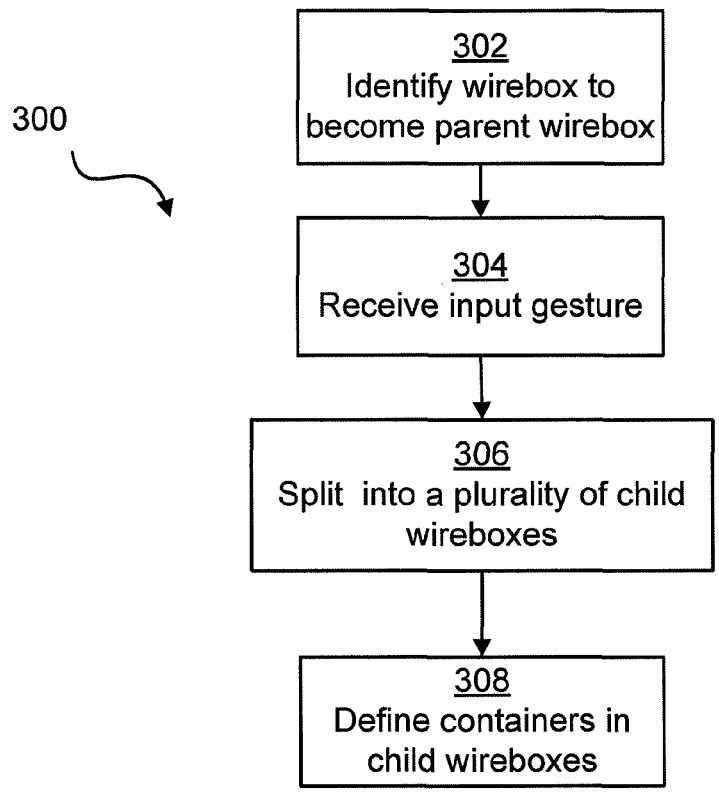
FIG. 3 is a flowchart showing steps of an exemplary method for defining a wireframe.

Turning to FIG. 3, steps in an exemplary method 300 for defining a wireframe will be discussed. Block 302 represents identifying a wirebox that is to become a parent to a plurality of leaf wireboxes. For example, a user may choose to create a new wireframe and can be presented a design canvas including a single wirebox, which would be the canvas parent wirebox, or the user may open an existing template and modify the wireboxes defined therein.

Consider, for example, wirebox AEHC of FIG. 2 but with only a single container and no contents nested therein. As another example, a wirebox within a wireframe comprising multiple wireboxes may be selected by suitable input, such as by a user clicking in or on the wirebox component.

Block 304 represents receiving data representing an input gesture. For example, blocks 302 and 304 may occur together when a user pushes the "control" key while clicking on a segment of a wire and dragging from the segment into the container. This action can be interpreted as a command to designate the selected wirebox to be split into a plurality of leaf wireboxes as indicated at block 306. While the user is dragging, output can be included in the display representing a new border within the parent wirebox defining the child wireboxes.

For example, the location of the user's click and drag direction may be identified to determine which wirebox to split. For instance, if the user clicks and drags from wire 224 and drags into container 214, then selected wirebox would be wirebox ABCD. On the other hand, the user may click wire 224 and drag into container 216 or 218. In such cases, wire 224 is not treated as a single unit; rather, depending on the click location, it may be treated as wire BG (i.e., if the user drags into wirebox BEFG) or wire GC (if the user drags into wirebox GFHC).

The parent wirebox can be split into a plurality of child wireboxes based on the input such as where the user's drag input stops. Consider, for example, design canvas 200 but in a state in which containers 216 and 218 have not yet been defined. Instead, assume only wireboxes ABCD and BEHC exist. A user may control-click at wire 208 somewhere to the right of where wires 208 and 210 intersect and drag the wire into the right side wirebox BEHC. In this case, a wire segment corresponding to segment CH can be presented during the dragging. The user may drag the segment upward until it reaches a final position corresponding to wire 212. Thus, wireboxes BEFG and GFHC can be defined.

In some embodiments, more than two child containers can be defined at once. For instance, as will be noted in examples below, guides or selection mechanisms may be provided for a user to define two or more new wires within a parent wirebox.

Containers corresponding to the new leaf wireboxes can be created as well. For example, as will be noted below, a hierarchical structure of folders can be updated based on whether folders for the newly-created containers should be nested inside a parent folder corresponding to the parent wirebox or whether the folders for the newly-created containers should replace the parent folder.

In addition to or instead of defining new wireboxes, a user may also adjust characteristics of existing wireboxes via suitable input. For example, a user may click on a wire such as wire 224 and move it to the left or right to adjust the relative size of container 214. In response, the wireframe management module 124 can adjust both the width of wirebox ABCD and the wireboxes also bordered by wire 224 (in this example wireboxes BEFG and GFHC). This may represent an advantage over defining a wireframe using simple rectangles since adjustment of one rectangle may not adjust the size of bordering rectangles. If containers are defined within wirebox borders, then container sizes can be adjusted while holding margins constant.

The margins may be adjustable independently of adjustment to wirebox boundaries. For example, a user may click and drag from one of margin lines 222-242 to adjust the margin line individually or may click and drag along with a function key to adjust all margin lines of a container simultaneously. In some embodiments, when child wireboxes are defined, the containers of the child wireboxes inherit the margin and other properties of the container in the parent wirebox.

Figure 4:
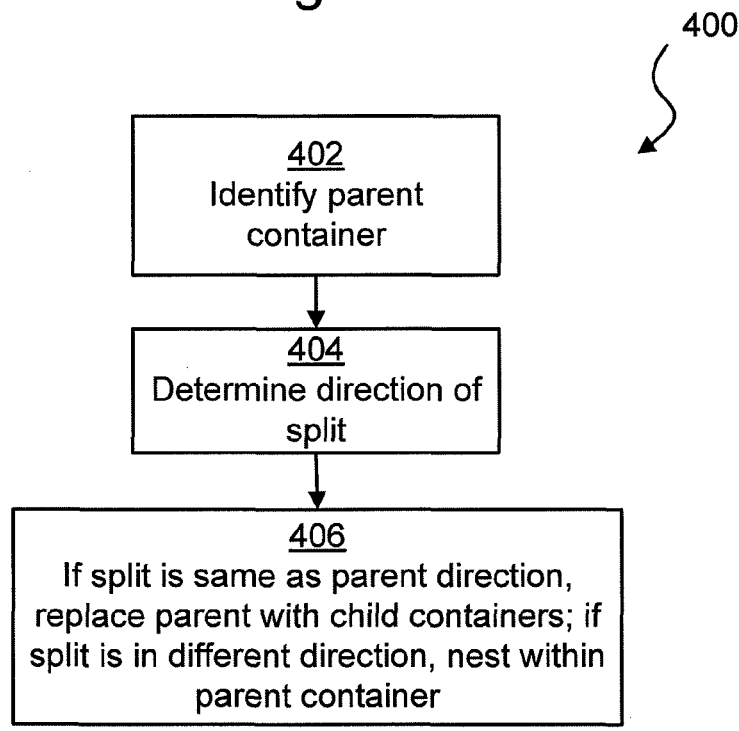
FIG. 4 is a flowchart showing steps of an exemplary method for maintaining a hierarchical tree structure.

Turning to FIG. 4, steps in an exemplary method 400 for generating a hierarchical tree structure will be discussed. As was mentioned above, in some embodiments a logical tree structure for associating content items with containers can be defined as the containers are defined. In this example, the tree comprises nested folders, although another logical structure could be used. More generally, the tree can comprise data identifying the hierarchy of containers and may also include identifiers of memory locations for content items to be associated with or placed into containers. Method 400 can occur alongside steps of method 300, such as after a parent wirebox is identified and when child wireboxes are being created.

At block 402, a parent folder corresponding to the container of the parent wirebox is identified. For example, if a new wireframe is being designed, then a parent folder corresponding to the container defined by the canvas parent wirebox can be identified. As another example, when a user clicks on a wirebox within a wireframe comprising multiple wireboxes, the folder corresponding to the container of the clicked-upon wirebox can be identified.

Blocks 404 and 406 represent determining whether or not to nest the folders of the newly-created child containers inside the parent container or in place of the parent container based on comparing a direction of the split with a direction associated with the parent wirebox. As will be discussed below, for a wirebox split into child wireboxes along a direction that is the same as the direction associated with the parent wirebox, the folders for the containers of the respective child wireboxes replace the folder for the parent so that the child wirebox containers are treated as being at the same level of the hierarchy as their parent was. On the other hand, if the direction of the split differs, the folders for the child wireboxes will be nested inside the folder for the parent (i.e. at the next level below in the hierarchy).

For the case of the first split of a wireframe (e.g., the initial split of wireframe AEHD to ABCD and BEHC in FIG. 2), the canvas parent wirebox may not technically have a split direction, and so the resulting containers can be nested alongside one another inside the container for the canvas parent wirebox and can be assigned a direction equal to the split direction. For example, wire 210 of FIG. 2 may have been added in response to a user clicking and dragging inward from one of wires 202 or 206. The folders corresponding to wireboxes ABCD and BEHC would in this example be assigned a direction of "horizontal" since the original split occurs horizontally.

Continuing with this example, assume that wire 212 is due to a user clicking and dragging inward from segment BE of wire 204 or segment CH of wire 208. In this case, wirebox BEHC with a "horizontal" direction is subject to a split along the vertical direction. Wireboxes BEFG and GFHC can be assigned a direction of "vertical." Accordingly, the child wireboxes are considered to be below the parent wirebox in the hierarchy, so the folders for wireboxes BEFG and GFHC can be nested inside the folder for BEHC.

Detailed Example of Wireframe Design

Turning now to FIGS. 5A-5F, a more detailed example of wireframe design and use will be presented. In this example, output 500 represents a display that includes a design canvas with a canvas parent wirebox 502. Additionally, the canvas features rulers/guides 506 and 508, along with a container palette 512. In this example, a hierarchical tree structure will be created alongside the wireframe, with containers of the wireframe identified in the container palette 512 and each layer having a corresponding folder for storing content items.

In FIG. 5A, only canvas parent wirebox 502 has been defined, and so container palette 512 has a single entry 522A corresponding to a folder for container 522 defined by canvas parent wirebox 502. Parent wirebox 502 is defined by wires 514, 516, 518, and 520. A margin M is illustrated by arrows in this example; although the margin is equal at all sides of container 522, different margin widths or no margin may be used.

As indicated by cursor 524 and arrow 526, a user has provided an input gesture that has spawned a wire segment 528 that is being dragged into container 522. As was noted above, the input gesture may be a click-key combination, such as control-click. This may allow for other click gestures to be used for other purposes. For example, clicking and dragging at a wire may simply reposition the wire and resize all containers/wireboxes defined by the wire while maintaining margins, while clicking and dragging in a margin (i.e. container boundary within a wirebox) may adjust the margin width. Of course, gestures and input commands can vary between embodiments.

Figure 5B:
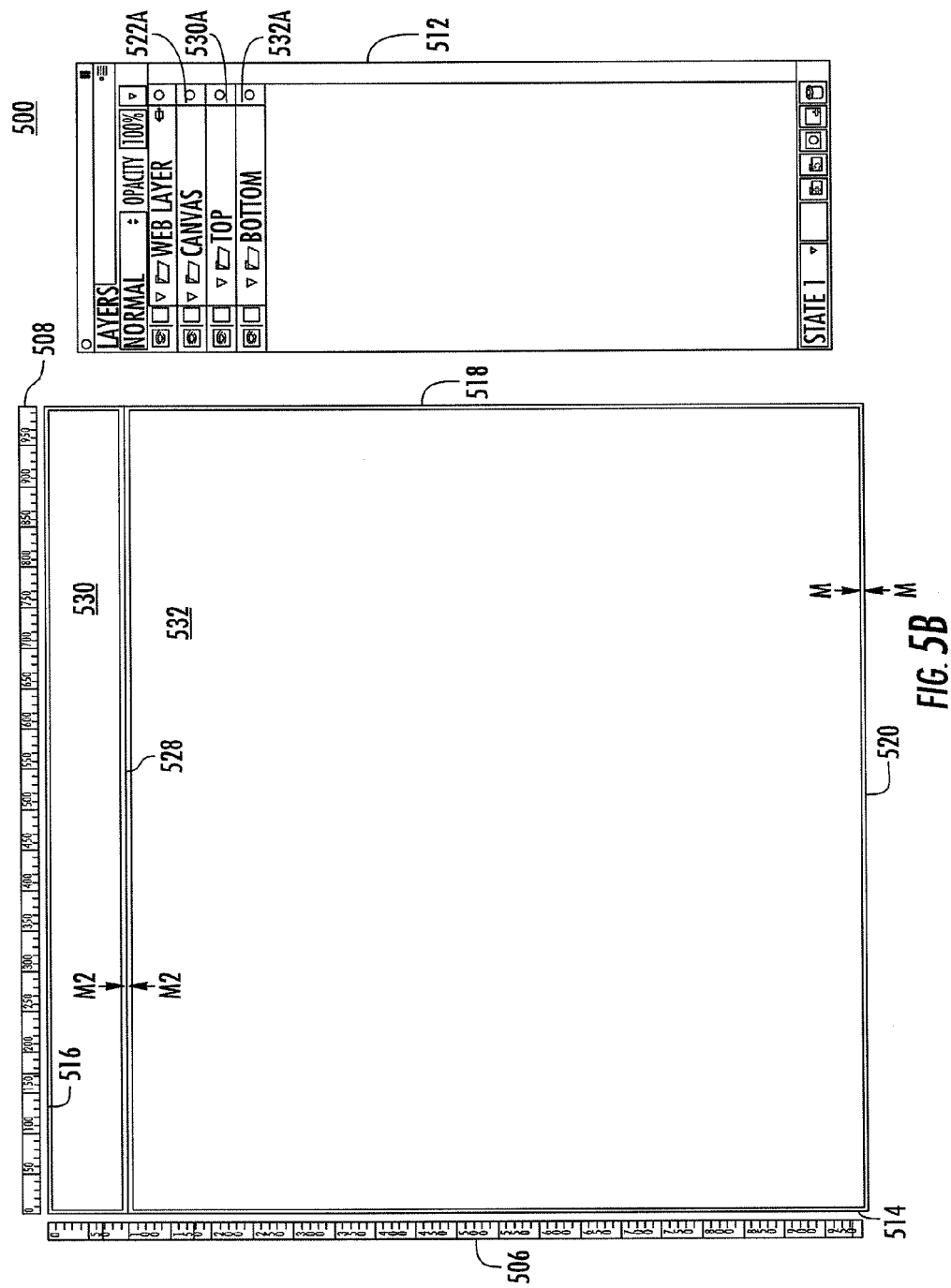

In this example, wire segment 528 is dragged downward to result in a vertical split of container 522, the end result of which is illustrated in FIG. 5B. Container 522 has been split into a top container 530 and a bottom container 532. Top container 530 has inherited the margin settings of parent container 522, so margin M2=M1. Since the creation of containers 530 and 532 is the initial split of the design canvas parent container, both containers 530 and 532 are assigned a direction of "vertical." As illustrated in layers palette 512, tree entries 530A and 532A have been entered and are nested inside tree entry 522A. This example uses a hierarchical tree structure, so the nested entries are depicted below the parent.

Figure 5C:
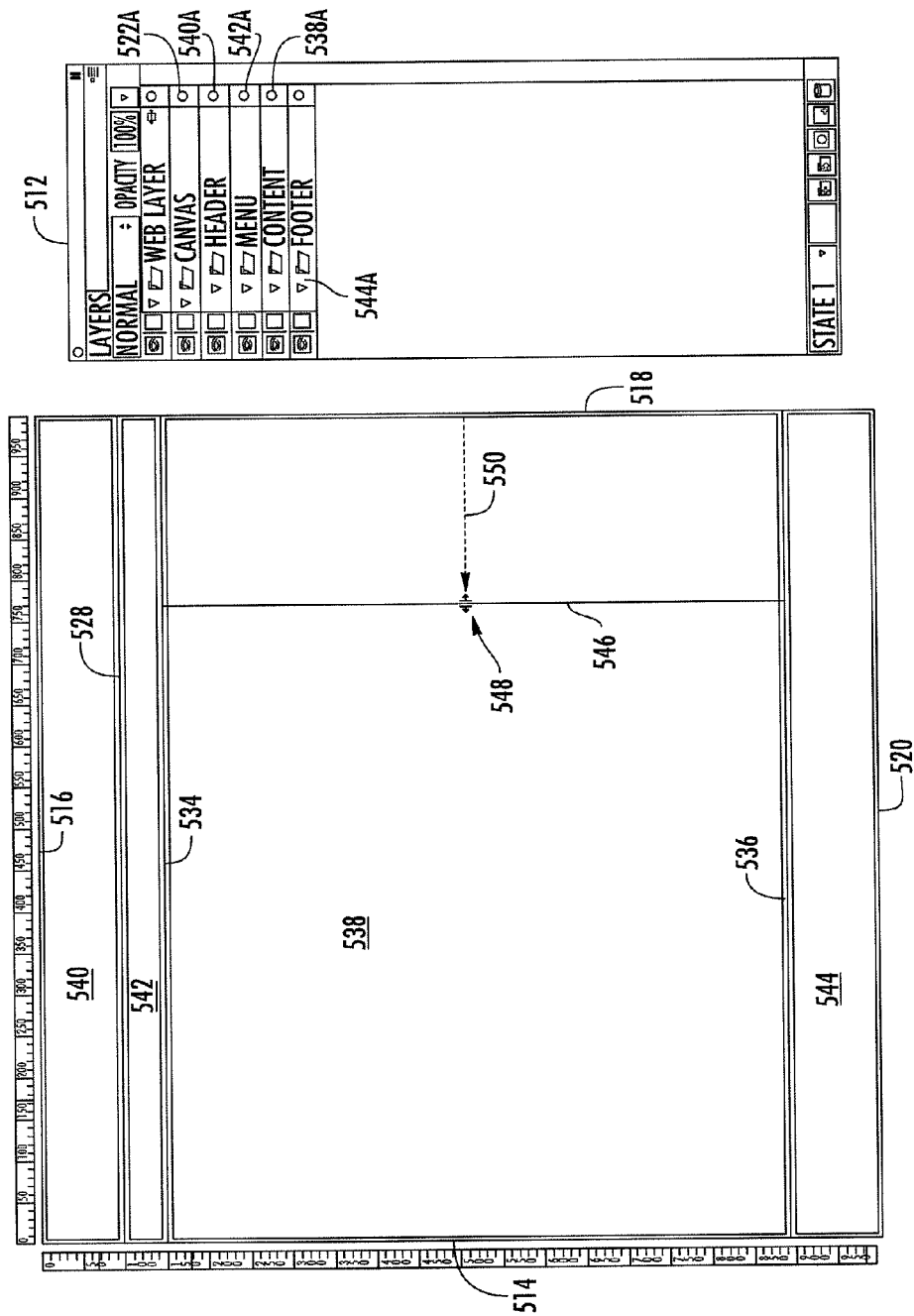

FIG. 5C skips past creation of additional containers due to vertical spits. For instance, wire 534 may have been dragged from wire 528 to split top container 530 into header container 540 and menu container 542. Similarly, bottom container 532 may have been split into menu container 538 and footer container 544 by dragging wire 536 upward from wire 520. As illustrated in layers palette 512, since the splits were all vertical splits of containers with a "vertical" direction, the corresponding entries 540A, 542A, 538A, and 544A are at the same level of the hierarchy relative to entry 522A and replace the folders for 530A and 532A.

Figure 5D:
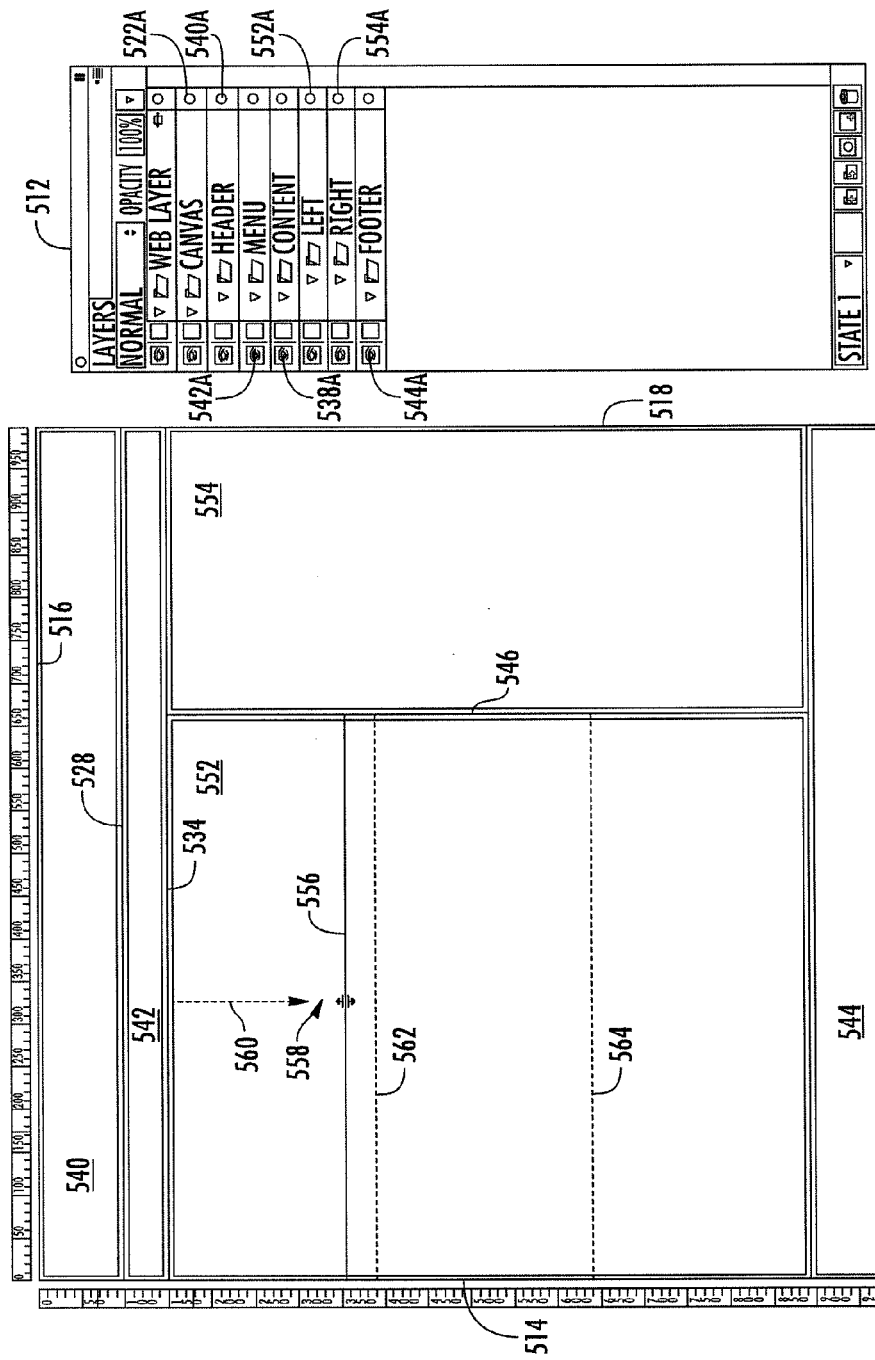

FIG. 5C also illustrates another split in progress—wire 546 is being dragged inward into container 538 from wire 518 as shown at 548 and 550. Turning to FIG. 5D, this has resulted in a horizontal split of container 538 into containers 552 and 554. Since the split is a horizontal split of a container with a "vertical" direction, the folders for child containers 552 and 554 are nested inside the folder for container 538 as illustrated by entries 538A, 554A, and 552A of pallet 512.

FIG. 5D also shows another split in progress via wire 556. As illustrated at 558 and 560, wire 556 is being dragged from a segment of wire 534 defining the wirebox comprising container 552. Additionally, a split suggestion is provided as illustrated by 562 and 564.

In some embodiments, a split suggestion can be generated based on the position of a wire being dragged as compared to the overall distance across which the wire could be dragged. In this example, the distance is from the top to the bottom of the wirebox comprising container 552. As the dragged wire approaches or reaches 1/n of the distance in the direction of the drag, the (n−1) potential wires for an equidistant split can be displayed as a split suggestion. In some embodiments, if a user stops dragging at the position of a split suggestion, then wires are defined at each suggestion point to provide n containers having the parent container's margin or a default margin. To avoid cluttering the interface, in some embodiments n is less than or equal to five, although in other embodiments any number n could be used.

In this example, wire 556 is approaching one third (⅓) of the vertical distance of the wirebox comprising container 552, so two wires are suggested for splitting the container into three equal portions. The user may allow creation of the wires but then adjust their vertical position if equally-sized wireboxes are not desired.

Figure 5E:
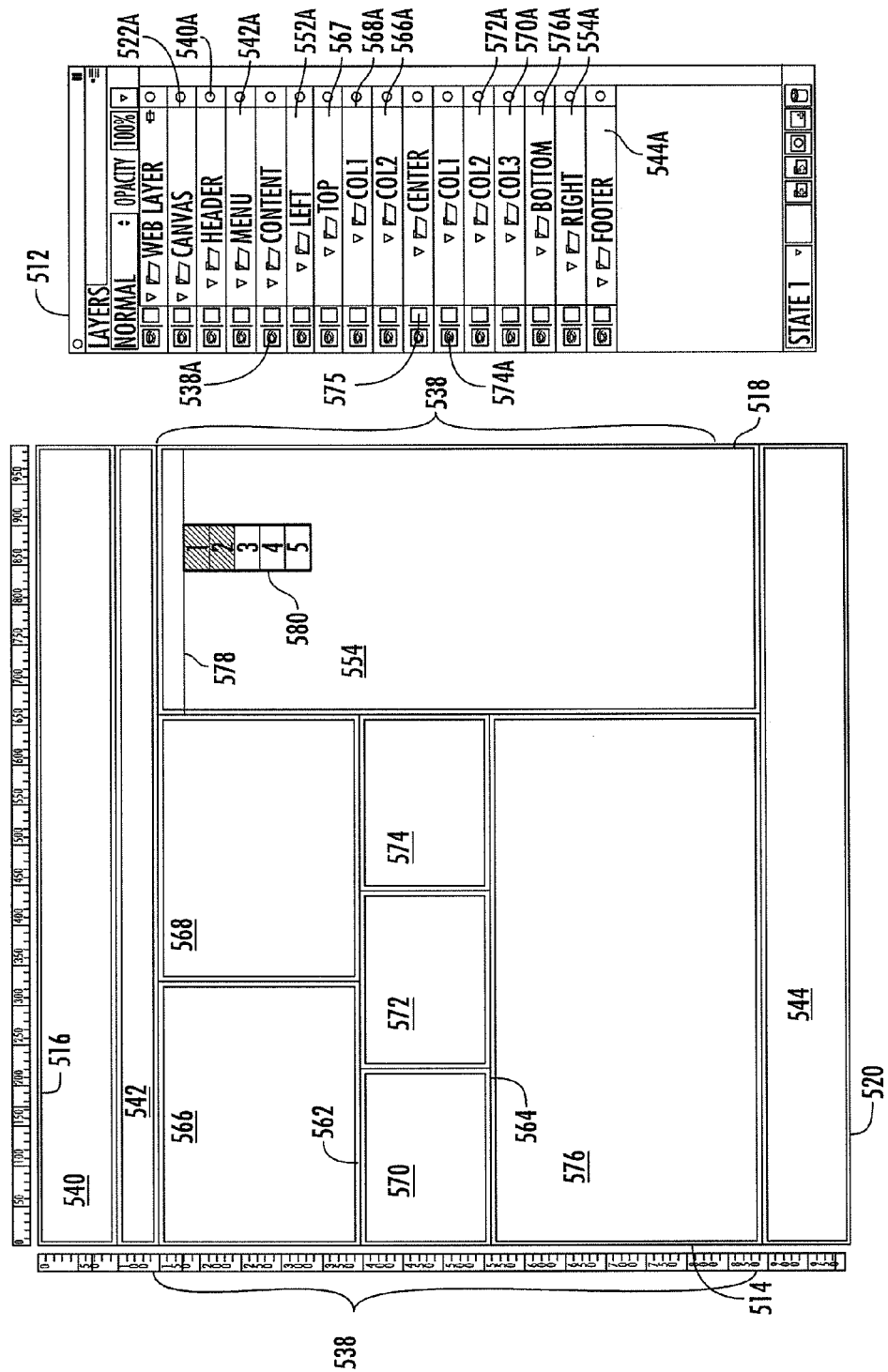

FIG. 5E skips ahead past some additional splits. As shown in FIG. 5E, wires 562 and 564 were created to vertically split the wirebox comprising container 552 and then were adjusted to have different vertical distances. Two of these child wireboxes were subsequently split in the horizontal direction themselves. Specifically, the topmost wirebox was split to result in respective wireboxes comprising containers 566 and 568 and the middle wirebox was split to result in respective wireboxes comprising containers 570, 572, and 574. The bottom wirebox was maintained and comprises a single container 576.

As indicated by palette 512, folders 566A and 568A are nested inside a "top" folder 567 that is itself nested inside left folder 552A, which is nested inside content folder 538A. This is because the wirebox comprising container 567, before splitting, was the result of a vertical split of the wirebox comprising container 552, which had a "horizontal" direction. The split of the wirebox comprising container 567 into wireboxes comprising containers 566 and 568 was a horizontal split of a "vertical" wirebox, so folders 566A and 568A are nested inside folder 567.

Similarly, respective wireboxes comprising containers 570, 572, and 574 resulted from a horizontal split of the "vertical" middle container, and so folders 570A, 572A, and 574A are nested inside a folder 575 that is nested inside folder 552A.

FIG. 5E also illustrates a vertical split of the wirebox comprising container 554. In this example, a user has provided input (e.g., a right click or shortcut key) to spawn a selection interface 580 for selecting a number of child wireboxes. Particularly, the selection "2" is highlighted and so a wire 578 is previewed splitting the container into two wireboxes. The interface may be spawned while dragging wire 578 or may be spawned without a dragging gesture or pressing a modifier key.

Figure 5F:
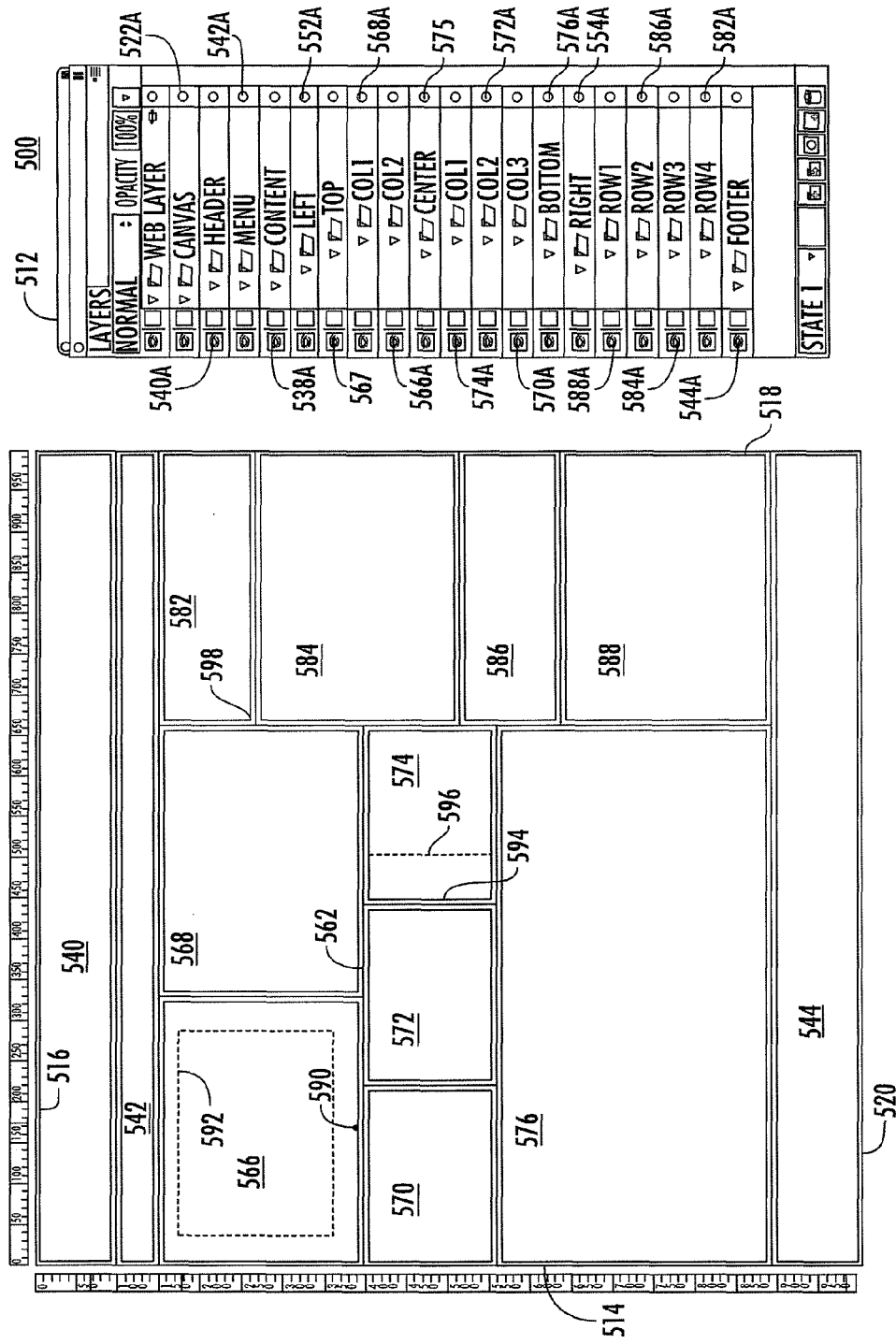

FIG. 5F illustrates the final wireframe design. The wirebox comprising container 554 has been split into four wireboxes (instead of two) comprising respective containers 582, 584, 586, and 588. Corresponding folders 582A, 584A, 586A, and 588A are nested inside folder 554A since the split was the result of a vertical split of a "horizontal" wirebox.

As was noted above, a wireframe can be adjusted via user input. For example, a user may click at 590 and drag inside container 566 to adjust all four margins for container 566 to a new width, with the new boundaries of container 566 within its wirebox illustrated at 592. The user may adjust a single margin, by a key-click combination. For example, by clicking at 594 while pressing the "alt" key, the left margin of container 574 can be moved to 596. As another example, a container can be resized within its wirebox by clicking and dragging at a corner, such as at 596.

A container or containers within a wirebox can be moved or resized so long as a container does not exit the wirebox. For example, a user may drag a container and its contents inside a wirebox. In some embodiments, dragging a container from one wirebox to another swaps the containers within the wireboxes. This behavior may be subject to the conditions that the containers have the same parent as determined from the direction associated with the containers so that adjustment of the folder structure is limited to the parent container only. Additionally, if a first container is dragged close to a wireframe boundary and a second container, the gesture may be interpreted as a command to create a space between the wireframe boundary and the second container. In any case, the interface may support a "snap" behavior in which the dragged container jumps into the wirebox receiving the container once more than half of the container is in the wirebox borders. As another example, wireboxes may be merged in response to a command, such as a "merge" command from a contextual menu spawned after selecting multiple wireboxes. When wireboxes are merged, the containers nested in the wireboxes may b merged as well.

Some embodiments support changing margins for multiple containers. As an example, a user may click in conjunction with a key to change the margins of a group of containers. For instance, a user may press shift while clicking on wire 546 to display an imaginary line illustrating the margins of all containers whose edges lie on the line and adjust the margins relative to the line together. For instance, the margins for containers 568, 574, 576, 582, 584, 586, and 588 relative to wire 546 could be adjusted.

In some embodiments, a container within a wirebox can be selected and resized while the wirebox size remains fixed. For example, the container may be selected and resized by clicking at a container corner and dragging, with the margin size adjusted as the container is resized. Margins may be selectable and margin texture can be made visible/invisible. In some embodiments, margins can be deleted by double-clicking inside the margin (i.e. between container boundary and a wire), or via a right-click or other contextual menu.

Once creation/editing of the wireframe is complete, the wireframe can be saved for later use. For example, the wireframe may be used as a layout template for designing an interface such as a web page or user interface for an application under development.

In some embodiments, the wireframe structure can be saved or exported separately from the hierarchical tree or separately from the containers. For instance, a user may export the grid design for the wireframe for use as a simple layout table or may export the wireframe with a different tree structure, such as a structure with containers mapped to folders, but the folders all nested at the same level.

As another example, the wireframe itself may not be exported separately, but may be relied upon in the export of other components. For example, the coordinates and positions of containers can be used to generate code for providing the content items laid out using the wireframe. Examples include, but are not limited to, page layouts for web pages or visual designs, and layouts for user interface components under design in development tools. A bound check of the leaf containers which fall within each content item's boundaries can be performed to identify leaf containers in the vicinity of the content item. Then, the leaf containers can be associated with the content items.

The wireframe can be used with the tree structure to facilitate any number of design tasks. For example, if a user is designing a web page, then graphics, text, and other content items can be dragged to various containers in the wireframe. Data representing the content items can be associated with the containers so that the wireframe structure can be used for exporting the completed design. For example, a web page may be build as a series of nested elements defined by <div> tags referencing CSS code in an HTML page or separate stylesheet. Based on the tree structure for the wireframe, an appropriate series of <div> tags can be generated for accessing components associated with the various containers. If folders are mapped to the tree, the content items may be stored in the folders for export of the nested folder structure containing the content items.

Figure 6:
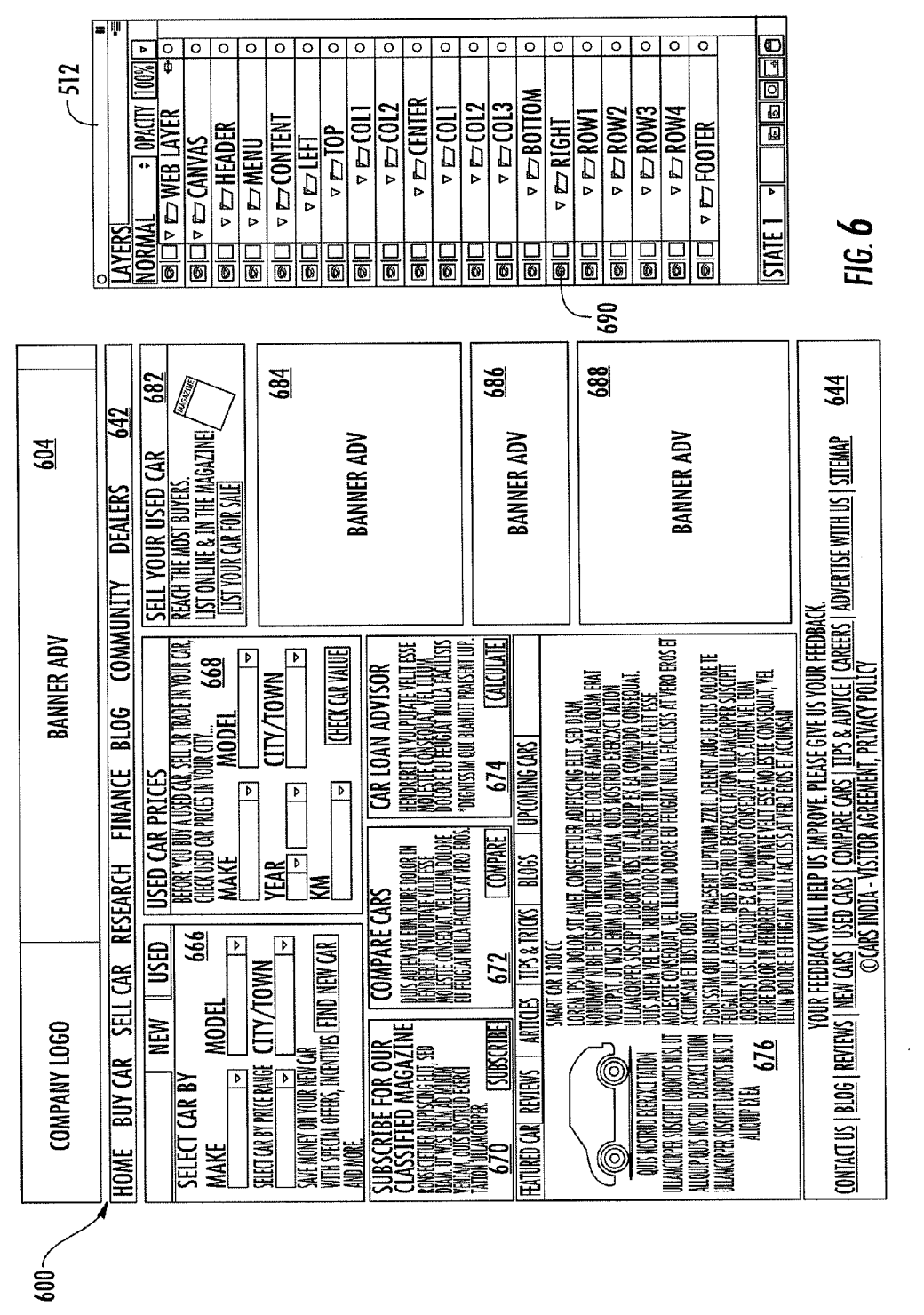

FIG. 6 illustrates an example of using a wireframe for layout and selection of content items of a composite media object 600. Particularly, this example depicts a web page having a plurality of visual and other elements laid out using the wireframe as shown in FIG. 5F above.

In this example, a header 604 has been placed in header container 540. The graphic(s) comprising header 604 may be placed in folder 540A as well. A menu bar 642 has been placed in or created in container 542. HTML code for providing the content of the menu bar (e.g., the menu items, links) may be stored in folder 542A, for example. A used car selection widget 666 and a price lookup widget 668 have been placed in containers 566 and 568, respectively. For example, in some embodiments the widgets may each comprise an HTML form, AJAX component, and/or a rich internet application whose constituent files are stored in folders 566A and 568A, respectively, when dragged into or defined in the containers.

In some embodiments, instead of functional components, visual elements 666 and 668 may be included as placeholders for later addition by another design team member or automatic generation when the design is deployed. For instance, a plurality of banner ad placeholders 684, 686, and 688 are positioned in containers 584, 586, and 588, respectively. Code for invoking the banner ads may be included in folders 584A, 568A, and 588A or placeholders 584-588 may simply be included to account for space that will be filled with banner ads after the design is complete.

The design also includes a subscription teaser 670, comparison teaser 672, and car loan advisor 674 in containers 570, 572, and 574. These teasers may, for example, comprise previews of other pages that may be accessed by clicking on the respective "subscribe," "compare," and "calculate" buttons. Finally, an interface element 676 featuring its own content area and tabbed interface is positioned in container 576. For instance, interface element 676 may comprise a rich internet application or embedded web page. A footer 644 is placed in footer container 544 to complete the page layout.

FIG. 6 also includes container palette 512, which can be used in the course of editing design 600. For example, assume a user wishes to apply an effect such as a drop shadow to the text of containers 682, 684, 686, and 688. Rather than selecting each container or items therein individually, the user can instead select the container comprising the items of interest; in this example, this would be achieved by selecting the "right" container as indicated at 690 (corresponding to folder 554A, which contains the folders for containers 682A, 684A, 686A, and 688A).

Figure 7:
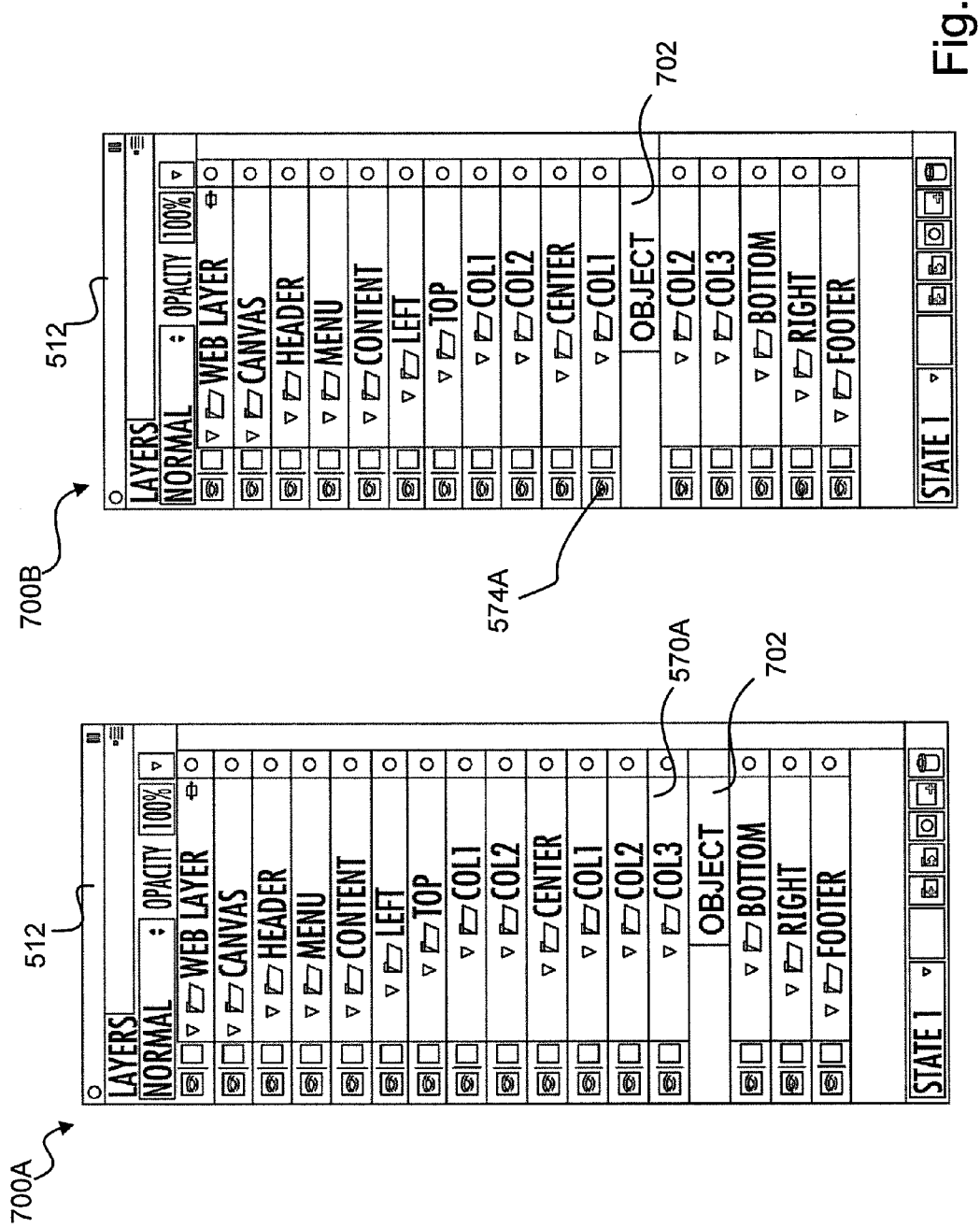
FIG. 7 is a diagram illustrating a container palette in closer detail.

FIG. 7 is a diagram featuring two views 700A and 700B each illustrating container palette 512 in closer detail. For example, a user may drag an object into one of the containers, such as container 570A shown in FIG. 5F. In response, the container palette can be updated to include an icon 702 representing the object. The object may be moved from one container to another. In some circumstances, the object may be dragged or associated with multiple containers. For instance, the object may be placed across borders of a container or resized (e.g., an image stretched across the containers). If the object is placed into multiple containers, it may be removed from the container palette; however, in some embodiments, if the object spans multiple containers in a common wirebox, the object may be placed into a folder corresponding to the wirebox. On the other hand, if the object is placed into another container, the icon can be adjusted accordingly. View 700B illustrates the container palette after the object is dragged into container 574; icon 702 has been placed in the tree corresponding to folder 574A. The data representing the object may also be placed into the appropriate folder.

If multiple objects are selected/moved together, the placement of each object can be considered individually; some objects may be moved to different containers, some objects may span multiple containers, and some objects may remain in the same container, depending on the particular objects selected and the user's input. In some embodiments, an object can be selected in container palette and moved to another folder in the palette; this can result in a corresponding adjustment in the design area. For instance, a user may click on object icon 702 and place it in another folder within the tree.

Embodiments can support interaction and synchronization between container palette and a layers palette used to select from multiple layers defined in a design area over which the wireframe is positioned. For example, if an object is moved between containers in the container panel, the objects below and above (as indicated by z order) the moved object at the new location are identified in the container panel based on information from the layers panel. The objects can be searched in the layers panel and the object which was moved in containers panel is removed from its existing place in the layers panel and placed in anywhere between the two objects which were searched; this may, for instance, maintain z order visibility.

As another example, if an object is moved between folders in the layers panel, the object that is moved can be identified in the container panel and z order determined like above. The difference is that it will still remain in the same container. If a folder in the layers panel is moved, all objects can undergo the z-order test in container panel and are rearranged. On the other hand, since containers are mutually exclusive, moving containers in the container panel will not result in a change to the layers panel in some embodiments. A similar z-order test can be applied for adding and deleting items, while a one-to-one mapping and identification of objects/items can be used for locking and changing visibility of objects through selection in the layers panel.

In some embodiments, an algorithm is used to determine placement when an object is moved into a container (either from another container or from elsewhere, such as when an object is initially imported into a layout). For an object that falls entirely within a single leaf container, the object will be associated with that container. However, if the object spans more than one container, the bounds of the parent container(s) for the spanned containers are considered until the smallest parent container which completely includes the object is reached. The object can be placed below, above, or in between the child folders for the containers based on z-order visibility criteria or other parameters.

As was noted above, in some embodiments code can be generated based on the wireframe and associated hierarchical structure using a code generator 132. One example of code comprises HTML code that provides the layout using <DIV> tags and cascading style sheet (CSS) code and/or HTML code that uses table elements to achieve the layout.

To generate code using HTML/DIV, the folders in the container panel can be parsed from the bottom up, with the width and height for each div determined from the container bounds. Each div can correspond to a parent or a leaf container. Code for placement of objects within containers can be generated by providing margins and gaps based on the container margins and distance of the object from the container boundaries.

Each time a new folder is encountered, a new nesting level can be created and a div added if the direction associated with the folder is different; otherwise, a new div can be added at the same level of nesting as the div for the most recently considered folder. Widths and heights of an images or other can be taken from its bounds in the layout, with object-to-HTML object mapping performed for proper rendering of the objects (e.g., text mapped to text, bitmap graphics mapped to <img> tags, vector graphics mapped to <img> tags or <vector> tags, if supported).

To generate an HTML layout using tables, the folders can be parsed in any order. Width and height of the table can be determined from the parent container bounds. When transitioning from a parent container to a child container, a new table can be nested inside the row or column corresponding to the parent container if the parent and child containers have a different direction; otherwise a new row or column can be added based on the direction of the child container. Width and height of <tr> and <td> elements can be determined from child container bound, while width and height of images, text, and other objects can be taken from the object bounds. Margins and gaps can be determined as noted above, and appropriate object-to-HTML-object mapping can be performed.

An example of HTML/DIV code is provided in Appendix A, while an example of HTML/table code is provided in Appendix B. Each example includes only a single object—an image "1.gif," although in practice multiple images and other objects can be used. Some embodiments featuring code generation may trigger generation of new code in response to any change in the wireframe or layout that affects the container folder structure or content, such as visibility changes, hierarchy changes, movement of items between folders, layer panel changes, etc.

APPENDIX A

HTML/CSS Example

```
<!DOCTYPE html PUBLIC "-//W3C//DTD XHTML 1.0 Transitional//EN"
"http://www.w3.org/TR/xhtml1/DTD/xhtml1-transitional.dtd">
<html xmlns="http://www.w3.org/1999/xhtml">
<head>
<title></title> <meta http-equiv="Content-Type" content="text/html; charset=iso-8859-1" />
<link href="css/style.css" rel="stylesheet" type="text/css" />
<body>
<div id="Canvas">
    <div id="Footer">
    </div>
    <div id="Content">
        <div id="Right">
            <div id="Row4">
                <img src="images/1.gif" width="25" height="21"/>
            </div>
            <div id="Row3">
                <img src="images/1.gif" width="25" height="21"/>
            </div>
            <div id="Row2">
                <img src="images/1.gif" width="25" height="21"/>
            </div>
            <div id="Row1">
                <img src="images/1.gif" width="25" height="21"/>
            </div>
        </div>
        <div id="Left">
            <div id="Bottom">
            </div>
            <div id="Center">
                <div id="Col3">
                    <img src="images/1.gif" width="25" height="21"/>
                </div>
                <div id="Col2">
                    <img src="images/1.gif" width="25" height="21"/>
                </div>
                <div id="Col1">
                    <img src="images/1.gif" width="25" height="21"/>
                </div>
            </div>
            <div id="Top">
                <div id="Col2">
                    <img src="images/1.gif" width="25" height="21"/>
                </div>
                <div id="Col1">
                    <img src="images/1.gif" width="25" height="21"/>
                </div>
            </div>
        </div>
    </div>
    <div id="Menu">
    </div>
    <div id="Header">
    </div>
</div>
</body>
</html>
```

APPENDIX B

| HTML/tables Example |
| --- |

```
<!DOCTYPE html PUBLIC "-//W3C//DTD XHTML 1.0 Transitional//EN"
"http://www.w3.org/TR/xhtml1/DTD/xhtml1-transitional.dtd">
<html xmlns="http://www.w3.org/1999/xhtml">
<head>
<title>Table based</title>
<meta http-equiv="Content-Type" content="text/html; charset=UTF-8" />
</head>
<body bgcolor="#999999">
<table id="Canvas" width="800" height="600" border="0" cellspacing="0" cellpadding="0">
  <tr id="Footer">
  </tr>
  <tr id="Content">
     <table width="300" height="200" border="0" cellspacing="0" cellpadding="0">
        <td id="Right">
          <table width="300" height="200" border="0" cellspacing="0" cellpadding="0">
             <tr id="Row4">
                <img src="images/1.gif" width="25" height="21"/>
             </tr>
             <tr id="Row3">
                <img src="images/1.gif" width="25" height="21"/>
             </tr>
             <tr id="Row2">
                <img src="images/1.gif" width="25" height="21"/>
             </tr>
             <tr id="Row1">
                <img src="images/1.gif" width="25" height="21"/>
             </tr>
          </table>
        </td>
        <td id="Left">
          <table width="300" height="200" border="0" cellspacing="0" cellpadding="0">
             <tr id="Bottom">
             </tr>
             <tr id="Center">
                <table width="300" height="200" border="0" cellspacing="0" cellpadding="0">
                   <td id="Col3">
                      <img src="images/1.gif" width="25" height="21"/>
                   </td>
                   <td id="Col2">
                      <img src="images/1.gif" width="25" height="21"/>
                   </td>
                   <td id="Col1">
                      <img src="images/1.gif" width="25" height="21"/>
                   </td>
                </tr>
                <tr id="Top">
                   <table width="300" height="200" border="0" cellspacing="0" cellpadding="0">
                      <td id="Col2">
                         <img src="images/1.gif" width="25" height="21"/>
                      </td>
                      <td id="Col1">
                         <img src="images/1.gif" width="25" height="21"/>
                      </td>
                   </table>
                </tr>
             </table>
           </td>
        </table>
  </tr>
  <tr id="Menu">
  </tr>
  <tr id="Header">
  </tr>
</table>
</body>
```

General Considerations

Some portions of the detailed description were presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is here and generally is considered to be a self-consistent sequence of operations or similar processing leading to a desired result. In this context, operations or processing involve physical manipulation of physical quantities.

Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels.

Unless specifically stated otherwise, as apparent from the foregoing discussion, it is appreciated that throughout this specification discussions utilizing terms such as "processing," "computing," "calculating," "determining" or the like refer to actions or processes of a computing platform, such as one or more computers and/or a similar electronic computing device or devices, that manipulate or transform data represented as physical electronic or magnetic quantities within memories, registers, or other information storage devices, transmission devices, or display devices of the computing platform.

The various systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software, that programs or configures the computing system from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

As noted above, a computing device may access one or more computer-readable media that tangibly embody computer-readable instructions which, when executed by at least one computer, cause the at least one computer to implement one or more embodiments of the present subject matter. When software is utilized, the software may comprise one or more components, processes, and/or applications. Additionally or alternatively to software, the computing device(s) may comprise circuitry that renders the device(s) operative to implement one or more of the methods of the present subject matter.

Examples of computing devices include, but are not limited to, servers, personal computers, personal digital assistants (PDAs), cellular telephones, televisions, television set-top boxes, portable music players, and consumer electronic devices such as cameras, camcorders, and mobile devices. Computing devices may be integrated into other devices, e.g. "smart" appliances, automobiles, kiosks, and the like.

The inherent flexibility of computer-based systems allows for a great variety of possible configurations, combinations, and divisions of tasks and functionality between and among components. For instance, processes discussed herein may be implemented using a single computing device or multiple computing devices working in combination. Databases and applications may be implemented on a single system or distributed across multiple systems. Distributed components may operate sequentially or in parallel.

When data is obtained or accessed as between a first and second computer system or components thereof, the actual data may travel between the systems directly or indirectly. For example, if a first computer accesses data from a second computer, the access may involve one or more intermediary computers, proxies, and the like. The actual data may move between the first and second computers, or the first computer may provide a pointer or metafile that the second computer uses to access the actual data from a computer other than the first computer, for instance. Data may be "pulled" via a request, or "pushed" without a request in various embodiments.

The technology referenced herein also makes reference to communicating data between components or systems. It should be appreciated that such communications may occur over any suitable number or type of networks or links, including, but not limited to, a dial-in network, a local area network (LAN), wide area network (WAN), public switched telephone network (PSTN), the Internet, an intranet or any combination of hard-wired and/or wireless communication links.

Any suitable tangible computer-readable medium or media may be used to implement or practice the presently-disclosed subject matter, including, but not limited to, diskettes, drives, magnetic-based storage media, optical storage media, including disks (including CD-ROMs, DVD-ROMs, and variants thereof), flash, RAM, ROM, and other memory devices.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

What is claimed:

1. A method, comprising:
presenting a graphical interface depicting a wireframe comprising at least one wirebox, the wirebox including a container defined therein;
receiving input via the graphical interface, the input specifying a wirebox in the wireframe to split into a plurality of wireboxes;

in response to the input specifying the intended split, splitting the identified wirebox by defining a plurality of child wireboxes within the parent wirebox;

defining a plurality of containers in the plurality of child wireboxes; and maintaining a tree structure comprising entries for each container corresponding to a respective wirebox, wherein maintaining the tree structure comprises:

adding an entry to the tree structure for each of the plurality of containers corresponding to the child wireboxes based on the direction of the child wireboxes, wherein the entry for a child container corresponding to a respective child wirebox is entered at a child level in the tree structure below a parent level of the entry for a parent container corresponding to the parent wirebox based on one of (i) a child direction assigned to the respective child wirebox being different from a parent direction assigned to the parent wirebox or (ii) the parent wirebox not having an assigned direction, and wherein the entry of the child container corresponding to a respective child wirebox replaces the entry for the parent container corresponding to the parent wirebox based on the child direction assigned to the child wirebox being the same as the parent direction assigned to the parent wirebox.

2. The method set forth in claim 1,
wherein the input comprises selection of a wire defining a border of the identified wirebox.

3. The method set forth in claim 2,
wherein the input specifying the intended split comprises data representing an user input gesture comprising clicking on the wire and dragging from the wirebox border to a stopping location within the identified wirebox and representing a location of an intended border between the child wireboxes.

4. The method set forth in claim 2, further comprising assigning a direction to the child wireboxes based on whether the intended split divides the parent wirebox over its width or height.

5. The method set forth in claim 1, wherein entries of the tree structure comprise a folder for each wirebox in the wireframe.

6. The method set forth in claim 5, further comprising:
receiving a drag-and-drop gesture placing a content item in a container of the wireframe and, in response, storing data representing the content item in the folder mapped to the container.

7. The method set forth in claim 5,
wherein presenting the graphical interface depicting a wireframe comprises overlaying the wireframe on a composite object displayed in a design area and the interface comprises a container selection panel displaying the hierarchical tree structure; and
wherein the method further comprises:
receiving input selecting a container of the wireframe in the hierarchical tree structure, and
in response, selecting components of the composite object positioned in a portion of the design area corresponding to the selected container.

8. A computing system comprising:
a processor configured to execute program components stored on a non-transitory computer-readable medium embodying program components, the program components comprising:

an interface module configured to present a graphical interface depicting a wireframe and receive data representing a gesture selecting a wire defining a border of a wirebox comprised in the wireframe and intended to be a parent wirebox, the input specifying an intended split of the intended parent wirebox;

a wireframe management module configured to act in response to the input specifying the intended split to split the intended parent wirebox by defining a plurality of child wireboxes within the intended parent wirebox, wherein the wireframe defines at least one container and, after the split, a plurality of containers are defined in the respective child wireboxes; and a tree management module configured to maintain a tree structure comprising a hierarchy of logical components, each logical component corresponding to a respective container in a wirebox, wherein maintaining the tree structure comprises:

adding an entry to the tree structure for each of the plurality of containers corresponding to the child wireboxes based on the direction of the child wireboxes, wherein the entry for a child container corresponding to a respective child wirebox is entered at a child level in the tree structure below a parent level of the entry for a parent container corresponding to the parent wirebox based on one of (i) a child direction assigned to the respective child wirebox being different from a parent direction assigned to the parent wirebox or (ii) the parent wirebox not having an assigned direction.

9. The system set forth in claim 8, wherein the gesture comprises clicking on the wire and dragging from the wirebox border to a stopping location within the parent wirebox and representing an intended border of the child wireboxes.

10. The system set forth in claim 9, wherein the interface module is configured to provide a split suggestion during the gesture.

11. The system set forth in claim 8, wherein the wireframe management module is configured to assign a direction to the child wireboxes based on whether the intended split divides the parent wirebox over its width or height.

12. The system set forth in claim 8, wherein the interface module is configured to receive input dragging a wire bordering a plurality of wireboxes of the wireframe and, in response, change the size of the plurality of wireboxes together.

13. A non-transitory computer-readable medium embodying program code executable by a computing system, the program code comprising:

program code for accessing data defining a wireframe comprising a plurality of wireboxes and a plurality of containers defined in the wireboxes;

program code for displaying the wireframe in conjunction with a composite object displayed in an area and comprising a plurality of content items;

program code for identifying at least one content item based on selection of a container;

program code for receiving data representing selection of a wire defining a border of a parent wirebox comprised in the wireframe;

program code for receiving data specifying an intended split of the parent wirebox;

program code for splitting the parent wirebox by defining a plurality of child wireboxes within the parent wirebox in response to the input specifying the intended split, wherein containers are defined in the child wireboxes after the split; and program code for maintaining a tree structure comprising a hierarchy of logical components, each logical component corresponding to a respective container in a wirebox, wherein the program code for maintaining the tree structure comprises:

program code for adding an entry to the tree structure for each of the plurality of containers corresponding to the child wireboxes based on the direction of the child wireboxes, wherein the entry for a child container corresponding to a respective child wirebox is entered at a child level in the tree structure below a parent level of the entry for a parent container corresponding to the parent wirebox based on one of (i) a child direction assigned to the respective child wirebox being different from a parent direction assigned to the parent wirebox or (ii) the parent wirebox not having an assigned direction.

14. The computer-readable medium set forth in claim 13, wherein data representing at least one content item is stored in a folder, the folder mapped to the container in which the at least one content item is displayed.

15. The computer readable medium set forth in claim 14, further comprising:

program code for receiving a drag-and-drop gesture placing a content item in container; and program code for storing data representing the content item in the folder mapped to the container.

16. The computer-readable medium set forth in claim 14, further comprising program code for providing a container palette, the container palette depicting one or more folders corresponding to respective containers and an icon corresponding to the content item, wherein moving the icon in the palette adjusts the location of the content item from the folder mapped to the container to one of the one or more folders.

17. The computer-readable medium set forth in claim 16, wherein selection of a folder in the container palette selects all content items in the container to which the folder is mapped.

18. The computer-readable medium set forth in claim 13, wherein the tree structure comprises a folder for a parent wirebox comprising a plurality of containers, and wherein the computer-readable medium further comprises moving the content item to the folder for the parent wirebox if the content item spans the plurality of containers.

19. The computer-readable medium set forth in claim 14, further comprising program code for providing an interface for editing the wireframe, wherein individual wires or wire segments of wireboxes are selectable and containers can be resized or moved within or between wireboxes.

* * * * *